United States Patent
Ke (10) Patent No.: US 8,901,784 B2
(45) Date of Patent: Dec. 2, 2014

(54) VOICE COIL MOTOR WITH SPACER

(75) Inventor: Chau-Yuan Ke, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 56 days.

(21) Appl. No.: 13/596,027

(22) Filed: Aug. 27, 2012

(65) Prior Publication Data

US 2013/0241318 A1  Sep. 19, 2013

(30) Foreign Application Priority Data

Mar. 13, 2012 (TW) .............................. 101108543 A (51) Int. Cl.
*H02K 41/03* (2006.01)
*H02K 41/02* (2006.01)
*G03B 13/00* (2006.01)
*G02B 7/02* (2006.01)

(52) U.S. Cl.
USPC ..................... 310/12.16; 310/12.02; 348/345; 359/824

(58) Field of Classification Search
CPC ................................. H02K 41/035; G02B 7/04
USPC .............. 310/12.02, 12.16; 348/345; 359/824
See application file for complete search history.

(56) References Cited

U.S. PATENT DOCUMENTS

| | | | |
|---|---|---|---|
| 2007/0133110 A1* | 6/2007 | Huang | 359/824 |
| 2011/0169348 A1* | 7/2011 | Park | 310/15 |
| 2011/0205424 A1* | 8/2011 | Nakashima et al. | 348/360 |
| 2011/0235195 A1* | 9/2011 | Ke | 359/824 |

* cited by examiner

*Primary Examiner* — Tran Nguyen
*Assistant Examiner* — Jose Gonzalez Quinones
(74) *Attorney, Agent, or Firm* — Novak Druce Connolly Bove + Quigg LLP (57) ABSTRACT

A voice coil motor includes a stationary member, a moveable member, an upper resilient plate, and a lower resilient plate. The stationary member includes a receiving room and a magnetic unit. The magnetic unit consists of two magnets adhering to two sidewalls of the stationary member. The moveable member is received in the first receiving room and spaced from the stationary member. The moveable member includes a frame and coils wrapped around the frame. The coils face the magnets. The magnets and the coils cooperatively drive the moveable member to move upward from an initial position. The upper resilient plate and the lower resilient plate connect the stationary member with the moveable member. The two resilient plates provide a restoring force to drive the moveable member to return to the initial position.

10 Claims, 9 Drawing Sheets

VOICE COIL MOTOR WITH SPACER

BACKGROUND

1. Technical Field

The present disclosure relates to lens actuators and particularly to a voice coil motor for driving a lens barrel.

2. Description of Related Art

A voice coil motor is preferred for driving lenses in image capturing devices to achieve an auto-focus function of the image capturing devices. Many voice coil motors include a moveable frame for accommodating a lens barrel with lenses therein, a stationary frame accommodating the moveable frame, and a driving unit driving the moveable frame within the stationary frame. However, the voice coil motor is heavy and expensive.

Therefore, it is desirable to provide a voice coil motor, which can overcome or at least alleviate the limitations described.

DETAILED DESCRIPTION

Figure 1:
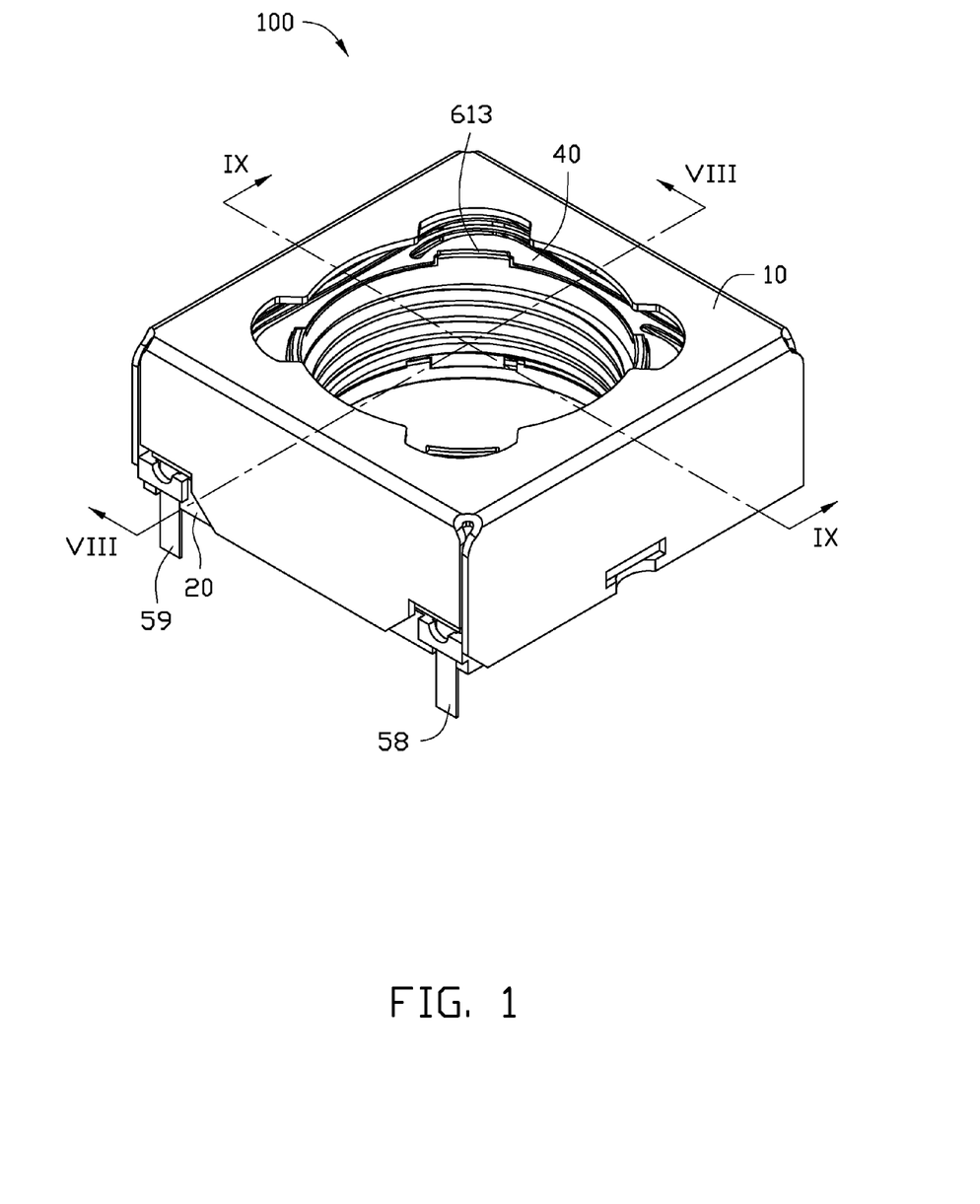
FIG. 1 is a schematic, isometric view of a voice coil motor including an upper resilient plate and a lower resilient plate, according to an exemplary embodiment.

Referring to FIG. 1, a voice coil motor 100, according to an exemplary embodiment, is shown. The voice coil motor 100 is used in image capturing devices, such as cameras, mobile phones, or digital videos, to drive a lens barrel (not shown) received therein.

Figure 2:
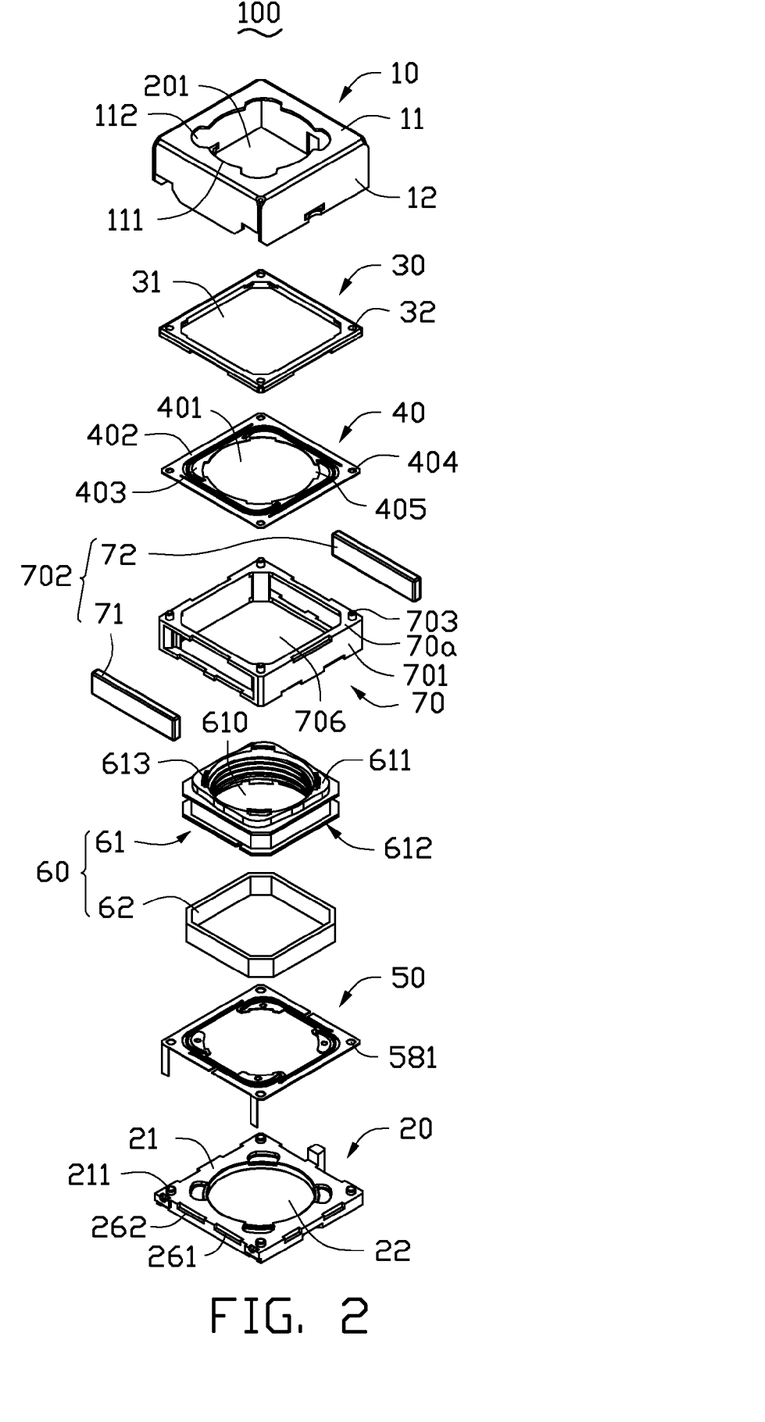
FIG. 2 is an exploded view of the voice coil motor of FIG. 1.
Figure 3:
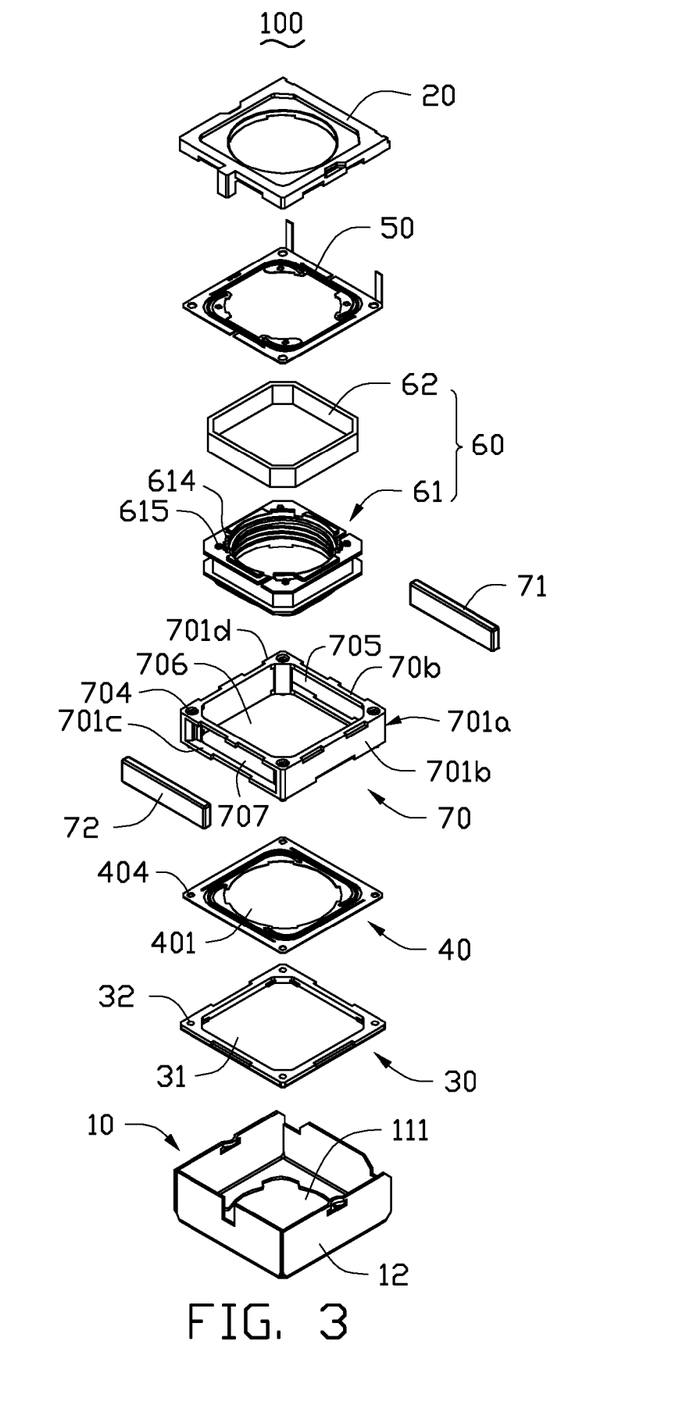
FIG. 3 is similar to FIG. 2, but viewed from another angle.

Referring to FIGS. 2-3, the voice coil motor 100 includes a housing 10, a base 20, a spacer 30, an upper resilient plate 40, a lower resilient plate 50, a stationary member 70, and a moveable member 60.

The housing 10 includes a top panel 11 and four side panels 12 perpendicularly extending from four peripheral sides of the top panel 11. The top panel 11 and the side panels 12 cooperatively define a cavity 201 for receiving the spacer 30, the upper resilient plate 40, the lower resilient plate 50, the moveable member 60, the stationary member 70, and the base 20. The top panel 11 is substantially rectangular and defines a first aperture 111 in a central portion thereof and four first cutouts 112 communicating with the first aperture 111. In this embodiment, the first aperture 111 is substantially circular. The first cutouts 112 are arranged around the first aperture 111 and are configured as an installation space for fixing a lens barrel (not shown) in the voice coil motor 100. The housing 10 is made of electromagnetic shielding material, such as nickel alloy, conductive plastic, surface conductive material, conductive glass, or other suitable shielding material. The housing 10 is configured for blocking contaminants such as dust and preventing electromagnetic disturbances.

The base 20 is substantially rectangular and includes a supporting surface 21 and four posts 211. The supporting surface 21 faces the housing 10. The posts 211 perpendicularly extend from four corners of the supporting surface 21. A second aperture 22 is defined in a central portion of the base 20 and is coaxial with the first aperture 111. A first passing hole 261 and a second passing hole 262 are defined in a side of the base 20. The base 50 supports the lower resilient plate 50, the stationary member 70, the moveable member 60, the upper resilient plate 40, and the spacer 30.

The spacer 30 is substantially rectangular and defines a rectangular through hole 31 in a central portion thereof. A locating hole 32 is defined at each of the four corners of the spacer 30.

Figure 4:
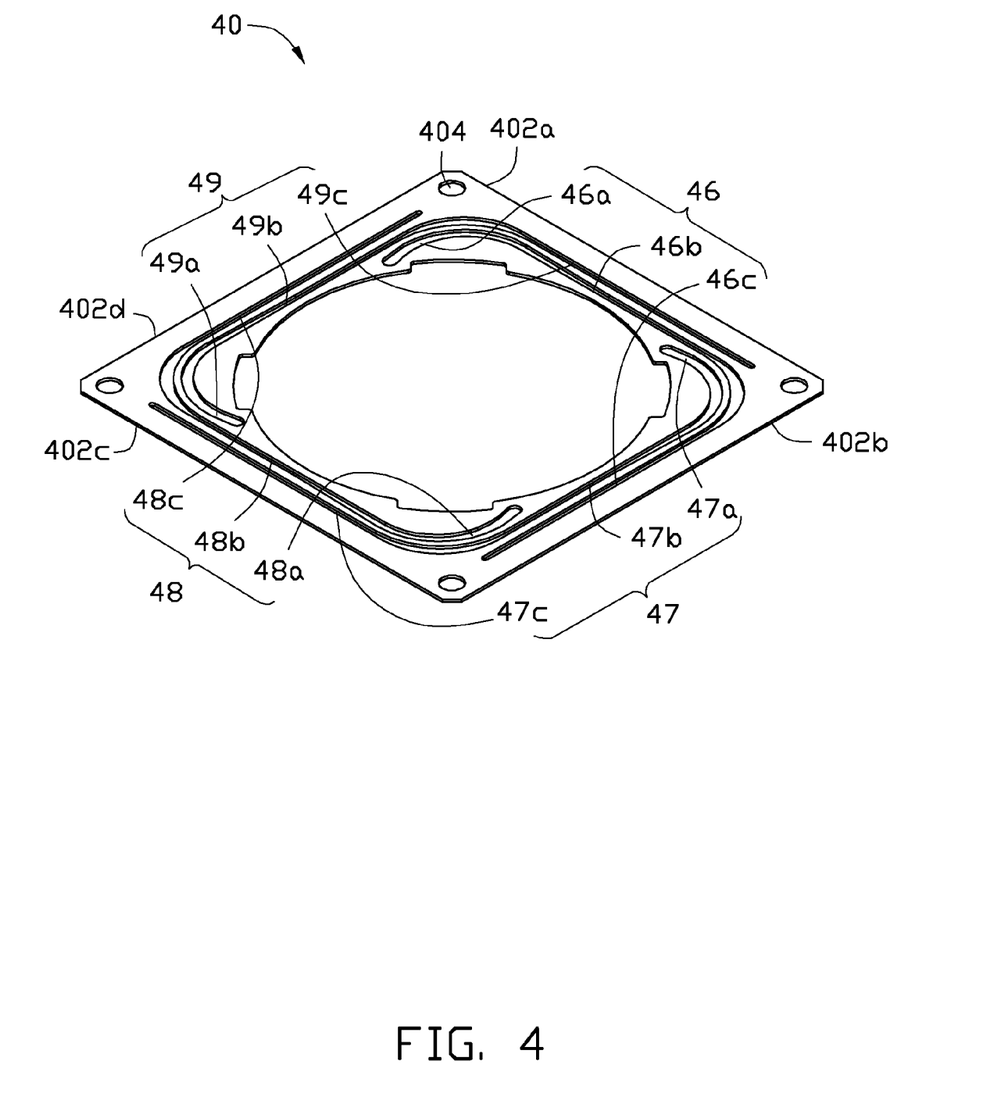
FIG. 4 is a schematic, isometric view of the upper resilient plate of the voice coil motor of FIG. 2.
Figure 5:
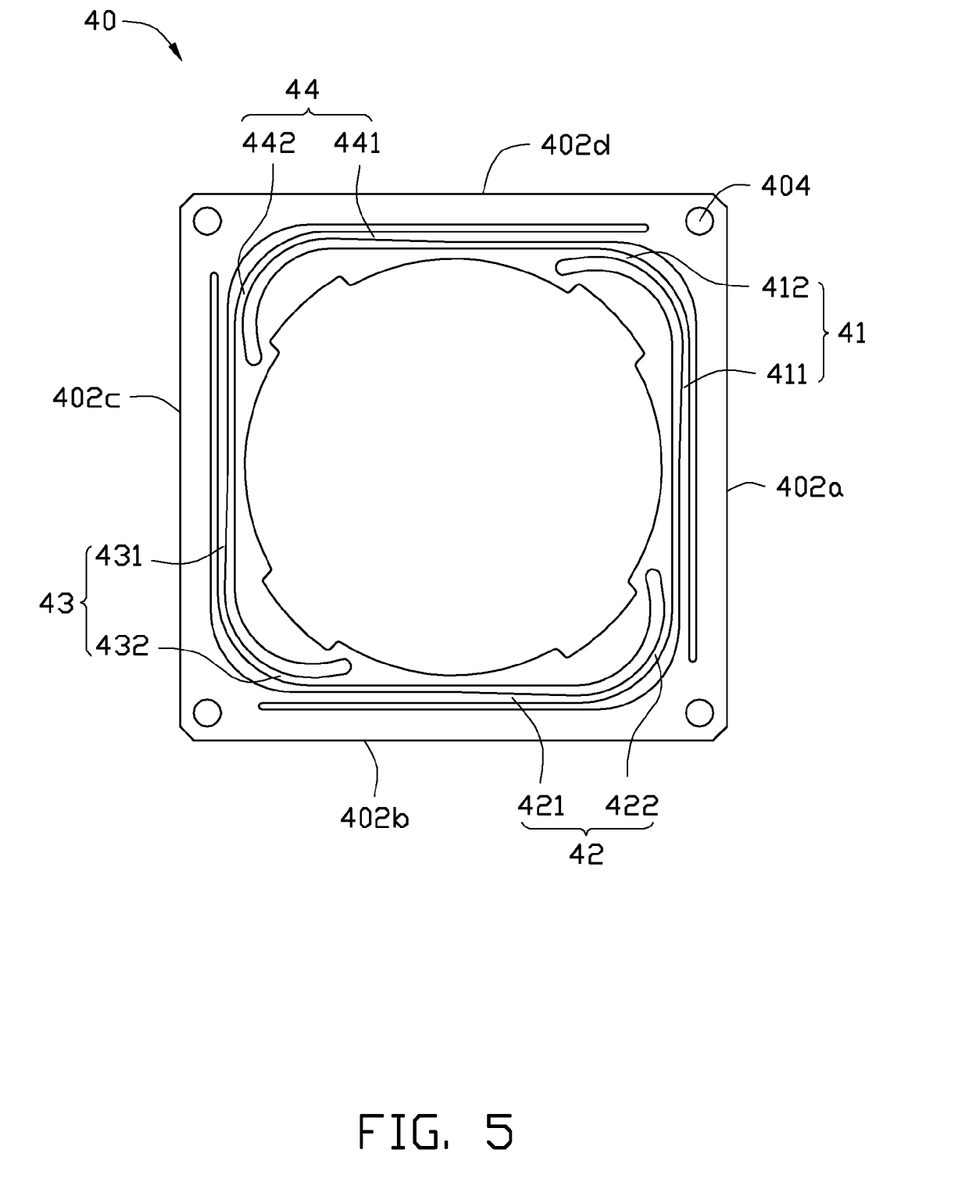
FIG. 5 is a top plane view of the upper resilient plate of FIG. 4.

Referring to FIGS. 2, 4, and 5, the upper resilient plate 40 defines a first light incident hole 401 in a central portion thereof. The first light incident hole 401 is coaxial with the first aperture 111. The upper resilient plate 40 includes a first external frame 402, a first internal frame 403 around the first light incident hole 401, a first resilient strip 41, a second resilient strip 42, a third resilient strip 43, and a fourth resilient strip 44. The four resilient strips (41, 42, 43, and 44) interconnect the first internal frame 403 and the first external frame 402. A first slot 46, a second slot 47, a third slot 48, and a fourth slot 49 are defined in the upper resilient plate 40 between the first external frame 402 and the first internal frame 403. The four slots (46, 47, 48, and 49) are oriented about 90 degrees with respect to each other.

The first external frame 402 is substantially square and defines four first positioning holes 404 at the corners. The first external frame 402 includes a first edge 402a, a second edge 402b, a third edge 402c, and a fourth edge 402d. The first edge 402a is substantially parallel to the third edge 402c, and the second edge 402b is substantially parallel to the fourth edge 402d.

The first internal frame 403 is substantially square and defines four second cutouts 405 at the corners. The second cutouts 405 communicate with the first light incident hole 401.

The first slot 46 includes a first starting portion 46a, a first connecting portion 46b, and a first ending portion 46c. The first starting portion 46a is substantially parallel to the fourth edge 402d. The first ending portion 46c is substantially parallel to the second edge 402b. The first connecting portion 46b is substantially parallel to the first edge 402a and interconnects the first starting portion 46a and the first ending portion 46c. The first ending portion 46c is about three times longer than the first starting portion 46a.

The second slot 47 includes a second starting portion 47a, a second connecting portion 47b, and a second ending portion 47c. The second starting portion 47a is substantially parallel to the first edge 402a. The second ending portion 47c is substantially parallel to the third edge 402c. The second connecting portion 47b is substantially parallel to the second edge 402b and interconnects the second starting portion 47a and the second ending portion 47c. The second ending portion 47c is about three times longer than the second starting portion 47a.

The third slot 48 includes a third starting portion 48a, a third connecting portion 48b, and a third ending portion 48c. The third starting portion 48a is substantially parallel to the second edge 402b. The third ending portion 48c is substantially parallel to the fourth edge 402d. The third connecting portion 48b is substantially parallel to the third edge 402c and interconnects the third starting portion 48a and the third ending portion 48c. The third ending portion 48c is about three times longer than the third starting portion 48a.

The fourth slot 49 includes a fourth starting portion 49a, a fourth connecting portion 49b, and a fourth ending portion 49c. The fourth starting portion 49a is substantially parallel to the third edge 402c. The fourth ending portion 49c is substantially parallel to the first edge 402a. The fourth connecting portion 49b is substantially parallel to the fourth edge 402d and interconnects the fourth starting portion 49a and the fourth ending portion 49c. The fourth ending portion 49c is about three times longer than the fourth starting portion 49a.

The second starting portion 47a, the first connecting portion 46b, and the fourth ending portion 49c are arranged outwards in that order from the central portion of the upper resilient plate 40. The third starting portion 48a, the second connecting portion 47b, and the first ending portion 46c are arranged outwards in that order from the central portion of the upper resilient plate 40. The fourth starting portion 49a, the third connecting portion 48b, and the second ending portion 47c are arranged outwards in that order from the central portion of the upper resilient plate 40. The first starting portion 46a, the fourth connecting portion 49b, and the third ending portion 48c are arranged outwards in that order from the central portion of the upper resilient plate 40.

The first resilient strip 41 is substantially L-shaped and arranged between the first slot 46 and the fourth slot 49. The first resilient strip 41 includes a first resilient portion 411 and a second resilient portion 412 connecting to the first resilient portion 411. A rounded corner is formed between the first resilient portion 411 and the second resilient portion 412. The first resilient portion 411 is substantially parallel to the first edge 402a and is connected to the first external frame 402. The second resilient portion 412 is substantially parallel to the fourth edge 402d and is connected to the first internal frame 403.

The second resilient strip 42 is substantially L-shaped and arranged between the first slot 46 and the second slot 47. The second resilient strip 42 includes a third resilient portion 421 and a fourth resilient portion 422 connecting to the third resilient portion 421. A rounded corner is formed between the third resilient portion 421 and the fourth resilient portion 422. The third resilient portion 421 is substantially parallel to the second edge 402b and is connected to the first external frame 402. The fourth resilient portion 422 is substantially parallel to the first edge 402a and is connected to the first internal frame 403.

The third resilient strip 43 is substantially L-shaped and arranged between the second slot 47 and the third slot 48. The third resilient strip 43 includes a fifth resilient portion 431 and a sixth resilient portion 432 connecting to the fifth resilient portion 431. A rounded corner is formed between the fifth resilient portion 431 and the sixth resilient portion 432. The fifth resilient portion 431 is substantially parallel to the third edge 402c and is connected to the first external frame 402. The sixth resilient portion 432 is substantially parallel to the second edge 402b and is connected to the first internal frame 403.

The fourth resilient strip 44 is substantially L-shaped and arranged between the third slot 48 and the fourth slot 49. The fourth resilient strip 44 includes a seventh resilient portion 441 and an eighth resilient portion 442 connecting to the seventh resilient portion 441. A rounded corner is formed between the seventh resilient portion 441 and the eighth resilient portion 442. The seventh resilient portion 441 is substantially parallel to the fourth edge 402d and is connected to the first external frame 402. The eighth resilient portion 442 is substantially parallel to the third edge 402c and is connected to the first internal frame 403.

Since the four resilient strips (41, 42, 43, and 44) are L-shaped and include smooth and rounded corners, the durability and flexibility of the upper resilient plate 40 is significantly enhanced.

Figure 6:
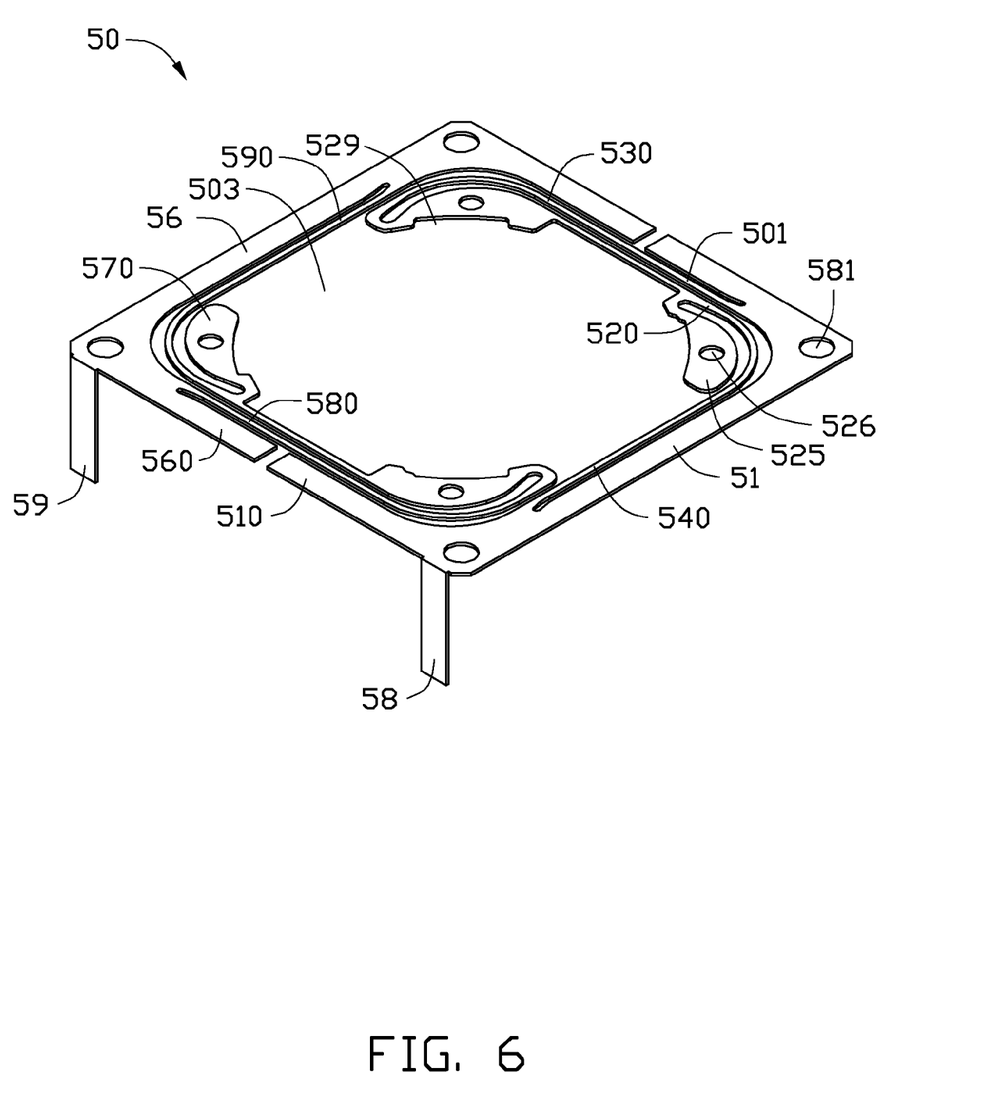
FIG. 6 is a schematic, isometric view of the lower resilient plate of the voice coil motor of FIG. 2.
Figure 7:
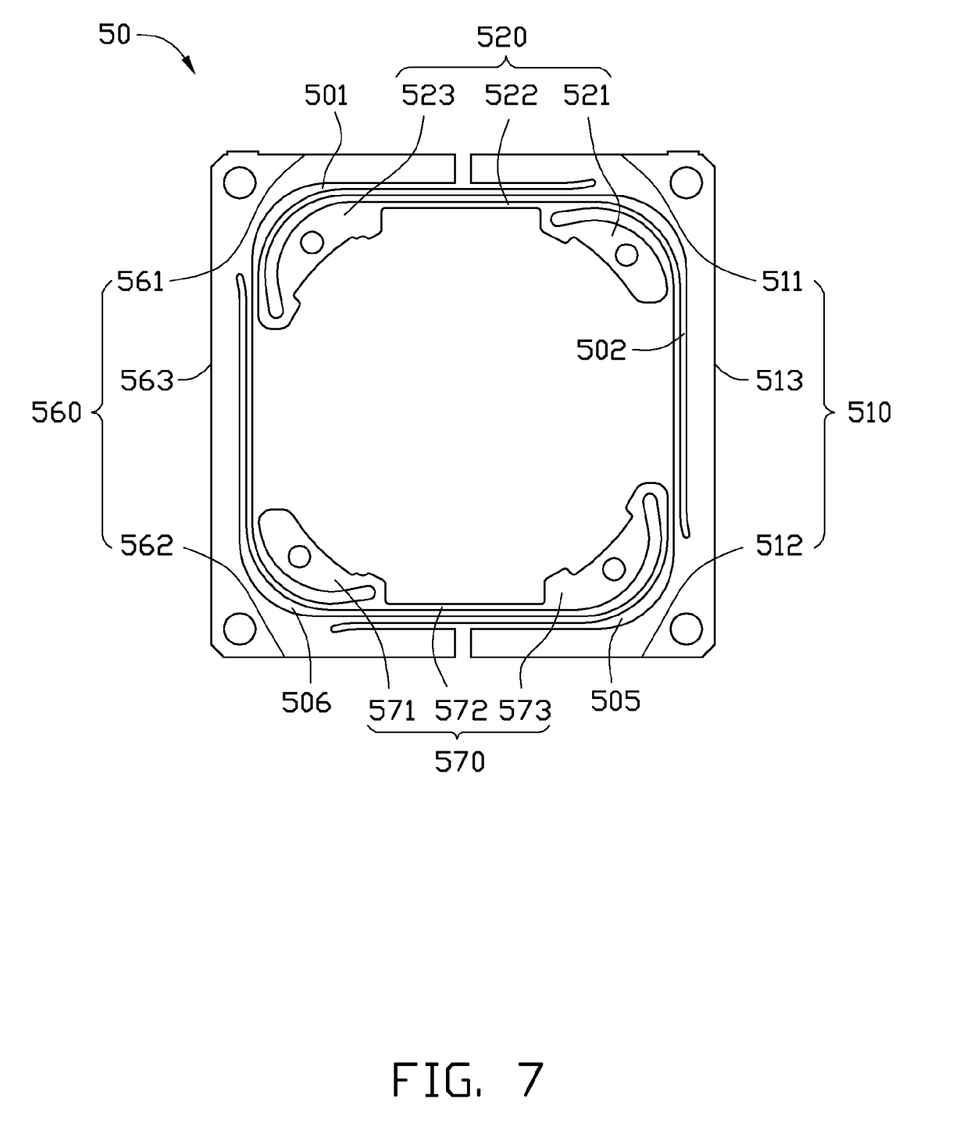
FIG. 7 is a top plane view of the lower resilient plate of FIG. 6.

Referring to FIGS. 2, 6, and 7, the lower resilient plate 50 is substantially square and defines a second light incident hole 503 in a central portion thereof and four second positioning holes 581 at the corners thereof. The second light incident hole 503 is coaxial with the first light incident hole 401. The lower resilient plate 50 includes a first member 51 and a second member 56 separated from the first member 51.

The first member 51 includes a U-shaped second external frame 510, a U-shaped second internal frame 520, a first resilient arm 530, a second resilient arm 540, and a first terminal 58. The second external frame 510 is oriented about 90 degrees with respect to the second internal frame 520. The second resilient arm 540 is oriented about 90 degrees with respect to the first resilient arm 530.

The second external frame 510 includes a first fixing arm 511, a second fixing arm 512, and a third fixing arm 513. The first fixing arm 511 is substantially parallel to the second fixing arm 512. The third fixing arm 513 perpendicularly connects the first fixing arm 511 to the second fixing arm 512. The three fixing arms (511, 512, and 513) cooperatively form a U-shaped structure.

The second internal frame 520 includes a first sheet 521, a first connecting arm 522, and a second sheet 523. The first sheet 521 and the second sheet 523 are arranged at positions which correspond to two adjacent corners of the lower resilient plate 50. The first connecting arm 522 is substantially parallel to the first fixing arm 511 and connects the first sheet 521 to the second sheet 523. The first sheet 521, the first connecting arm 522, and the second sheet 523 cooperatively form a U-shaped structure.

The first resilient arm 530 is substantially L-shaped. One end of the first resilient arm 530 is connected to the first fixing arm 511, and the other end of the first resilient arm 530 is connected to the second sheet 523. A first gap 501 is formed between the first resilient arm 530 and the first fixing arm 511. A second gap 502 is formed between the first resilient arm 530 and the second internal frame 520.

The second resilient arm 540 is substantially L-shaped. One end of the second resilient arm 540 is connected to the third fixing arm 513, and the other end of the second resilient arm 540 is connected to the first sheet 521. The second gap 502 is arranged between the third fixing arm 513 and the second resilient arm 540. A third gap 505 is formed between the second resilient arm 540 and the first sheet 521.

The first terminal 58 perpendicularly extends from the second external frame 510 toward the base 20. The first terminal 58 is positioned in a space between the second fixing arm 512 and the third fixing arm 513.

The second member 56 includes a U-shaped third external frame 560, a U-shaped third internal frame 570, a third resilient arm 580, a fourth resilient arm 590, and a second terminal 59. The third external frame 560 is oriented about 90 degrees with respect to the third internal frame 570. The third resilient arm 580 is oriented about 90 degrees with respect to the fourth resilient arm 590.

The third external frame 560 includes a fourth fixing arm 561, a fifth fixing arm 562, and a sixth fixing arm 563. The fourth fixing arm 561 is substantially parallel to the fifth fixing arm 562. The fourth fixing arm 561 and the first fixing arm 511 are arranged in one line. The fifth fixing arm 562 and the second fixing arm 512 are arranged in one line. The sixth fixing arm 563 perpendicularly connects the fourth fixing arm 561 to the fifth fixing arm 562. The three fixing arms (561, 562, and 563) cooperatively form a U-shaped structure.

The second internal frame 570 includes a third sheet 571, a second connecting arm 572, and a fourth sheet 573. The third sheet 571 and the fourth sheet 573 are arranged at positions which correspond to the two other adjacent corners of the lower resilient plate 50. The second connecting arm 572 is substantially parallel to the fifth fixing arm 562 and connects the third sheet 571 to the fourth sheet 573. The third sheet 571, the second connecting arm 572, and the fourth sheet 573 form a U-shaped structure.

The third resilient arm 580 is substantially L-shaped. One end of the third resilient arm 580 is connected to the fifth fixing arm 562, and the other end of the third resilient arm 580 is connected to the fourth sheet 573. The third gap 505 is arranged between the third resilient arm 580 and the fifth fixing arm 562. A fourth gap 506 is formed between the third resilient arm 580 and the third internal frame 570.

The fourth resilient arm 590 is substantially L-shaped. One end of the fourth resilient arm 590 is connected to the sixth fixing arm 563, and the other end is connected to the third sheet 571. The fourth gap 506 is arranged between the sixth fixing arm 563 and the fourth resilient arm 590. The first gap 501 is arranged between the fourth resilient arm 590 and the third sheet 571.

The second terminal 59 perpendicularly extends from the third external frame 560 toward the base 20. The second terminal 59 is also positioned in a space between the fifth fixing arm 562 and the sixth fixing arm 563.

Each sheet (521, 523, 571, and 573) defines a third positioning hole 526 in a central portion thereof and a third cutout 529. Each of the third cutouts 529 communicates with the second light incident hole 503.

Since the four resilient arms (530, 540, 580, and 590) are L-shaped and include rounded corners, the durability and flexibility of the lower resilient plate 50 is also significantly enhanced.

Referring to FIGS. 2-3, the stationary member 70 includes a stationary frame 701 and a magnetic unit 702.

The stationary frame 701 may be fixed to an electronic device, such as a digital camera. The stationary frame 701 is substantially cuboid and includes a first sidewall 701a, a second sidewall 701b, a third sidewall 701c, a fourth sidewall 701d, an upper surface 70a, a lower surface 70b, and four protrusions 703. The four sidewalls (701a, 701b, 701c, and 701d) are connected end-to-end and cooperatively define a first receiving room 706. The first sidewall 701a is substantially parallel to the third sidewall 701c. The second sidewall 701b is substantially parallel to the fourth sidewall 701d. The first sidewall 701a defines a first receiving hole 705 communicating with the first receiving room 706. The second sidewall 701b acts as a sealing sidewall. The third sidewall 701c defines a second receiving hole 707 communicating with the first receiving room 706. The fourth sidewall 701d acts as a sealing sidewall. In this embodiment, the second sidewall 701b and the fourth sidewall 701d are filled with elastic material, such as plastic or rubber, to act as a sealant.

The upper surface 70a and the lower surface 70b are positioned at opposite sides of the stationary frame 701. The four protrusions 703 perpendicularly extend from the four corners of the upper surface 70a corresponding to the four first positioning holes 404 and the four locating holes 32. Four engaging holes 704 are defined at the four corners of the lower surface 70b corresponding to the four posts 211.

The magnetic unit 702 includes a first magnet 71 and a second magnet 72. The first magnet 71 is fixed in the first receiving hole 705. The second magnet 72 is fixed in the second receiving hole 707. In the embodiment, the first magnet 71 is adhesively attached to the first receiving hole 705. The second magnet 72 is adhesively attached to the second receiving hole 707.

The moveable member 60 includes a moveable frame 61 and a number of coils 62. The moveable frame 61 is accommodated in the first receiving room 706. The moveable frame 61 defines a second receiving room 610 for accommodating a lens barrel (not shown). The second receiving room 610 is a through hole. The moveable frame 61 includes a top surface 611 and a bottom surface 612. The top surface 611 and the bottom surface 612 are positioned at opposite sides of the moveable frame 61. A first projection 613 protrudes from the top surface 611 corresponding to each of the second cutouts 405. A second projection 614 protrudes from the bottom surface 612 corresponding to each of the third cutouts 529. A pin 615 protrudes from the bottom surface 612 corresponding to each of the third positioning holes 526. The coils 62 are wrapped around the sidewalls of the moveable frame 61.

Referring to FIGS. 1-3 and 8-9, in assembly, the moveable member 60 is received in the first receiving room 706. The coils 62 face the first magnet 71 and the second magnet 72. The first projections 613 extend through the second cutouts 405 and are attached to the first internal frame 403 with adhesive, thereby fixing the first internal frame 403 to the top surface 611 of the moveable frame 61. The protrusions 703 extend through the first positioning holes 404 and the locating holes 32, and are attached with adhesive to the first external frame 402, thereby fixing the first external frame 402 to the upper surface 70a of the stationary frame 701. The protrusions 703 abut the top panel 11, and the spacer 30 abuts the top panel 11, thereby the upper resilient plate 40 is positioned between the spacer 30 and the stationary frame 701. The pins 615 extend through the third positioning holes 526 and are attached with adhesive to the second internal frame 520 and the third internal frame 570, thereby fixing the second internal frame 520 and the third internal frame 570 to the bottom surface 612 of the moveable frame 61. The posts 211 extend through the second positioning hole 581 and the engaging holes 704, thereby fixing the second external frame 510 and the third external frame 560 to the lower surface 70b of the stationary frame 70. The lower resilient plate 50 is supported by the base 20. The first terminal 58 passes through the first passing hole 261 and is electrically connected to an outside circuit board (not shown). The second terminal 59 passes through the second passing hole 262 and is electrically connected to the outside circuit board. The housing 10 receives and protects the lower resilient plate 50, the stationary member 70, the moveable member 60, the upper resilient plate 40, the spacer 30, and the base 20.

Figure 8:
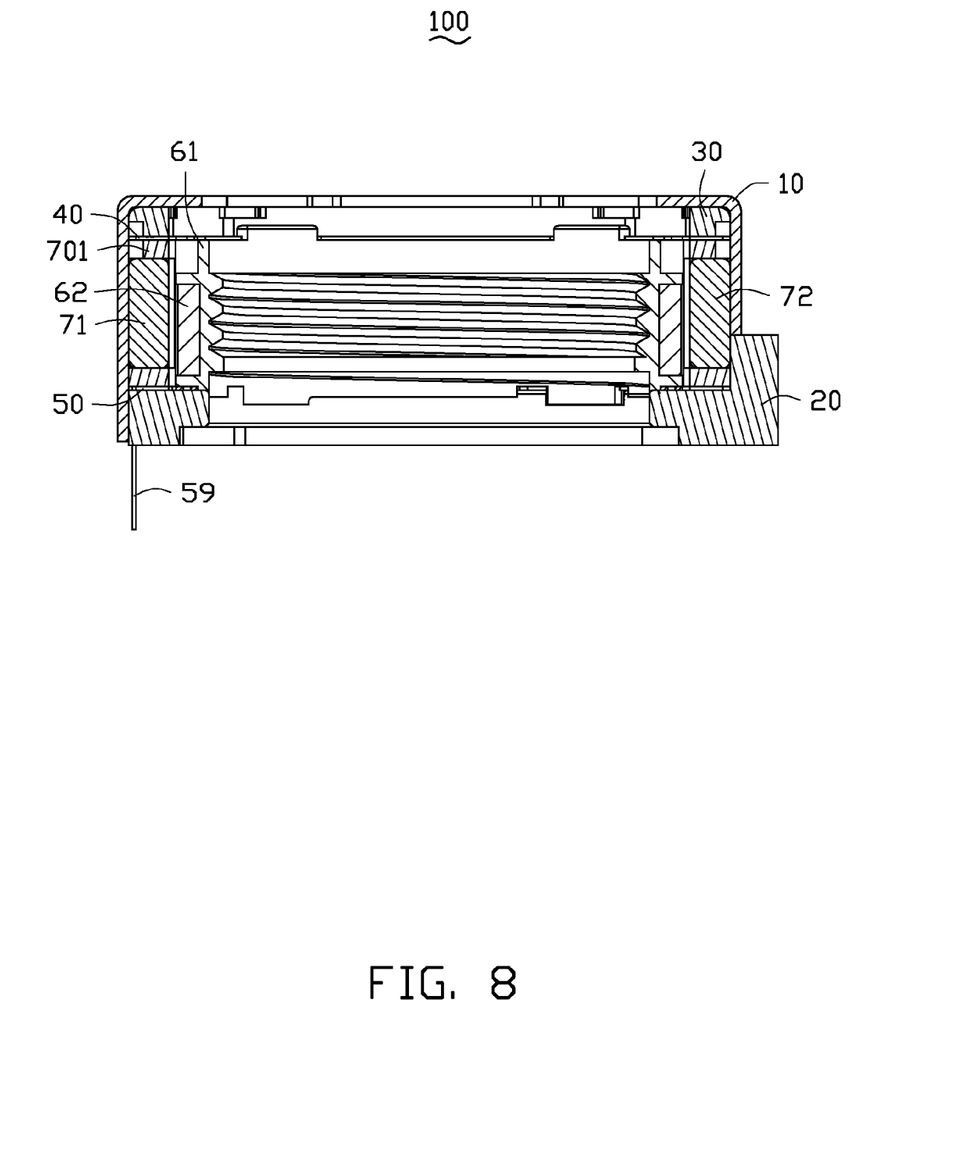
FIG. 8 is a sectional view of the voice coil motor taken along the line VIII of FIG. 1.
Figure 9:
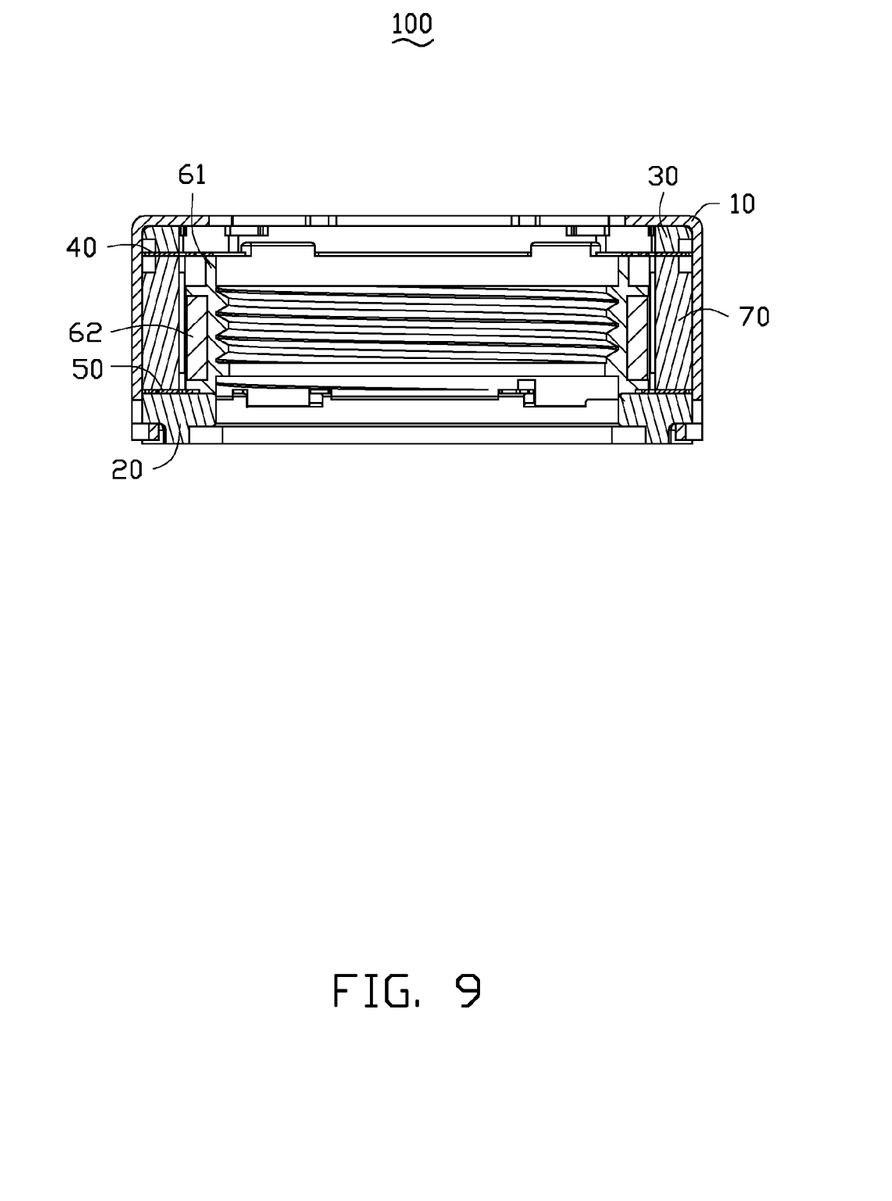
FIG. 9 is a sectional view of the voice coil motor taken along the line IX of FIG. 1.

When electricity is applied to the coils 62, the coils 62 are attracted or repelled to or from the first magnet 71 and the second magnet 72, thereby driving the moveable frame 61 with the lens barrel (not shown) to move upward from an initial position between the upper resilient plate 40 and the lower resilient plate 50 relative to the stationary member 70. When the electricity is cut off from the coils 62, the four resilient strips (41, 42, 43, and 44) and the four resilient arms (530, 540, 580, and 590) generate a restoring to drive the moveable member 60 with the lens barrel (not shown) to return to the initial position. In the voice coil motor 100, only two magnets 71 and 72 are required and applied, thereby reducing weight and reducing the cost of the voice coil motor 100.

Even though numerous characteristics and advantages of the present embodiments have been set fourth in the foregoing description, together with details of the structures and functions of the embodiments, the disclosure is illustrative only, and changes may be made in details, especially in the matters of shape, size, and arrangement of parts within the principles of the disclosure to the full extent indicated by the broad general meaning of the terms in which the appended claims are expressed.

What is claimed is:

1. A voice coil motor comprising:
   a stationary member comprising a stationary frame and a magnetic unit, the stationary frame defining a first receiving room, the magnetic unit consisting of two magnets, the magnets respectively attached to two sidewalls of the stationary frame, the stationary frame comprising an upper surface and four protrusions perpendicularly extending from four corners of the upper surface;
   a moveable member received in the first receiving room and spaced from the stationary member, the moveable member comprising a moveable frame and coils wrapped around the moveable frame, the coils facing the magnets, the coils and the magnets configured to cooperatively drive the moveable member to move upward from an initial position;
   an upper resilient plate and a lower resilient plate interconnecting the stationary member with the moveable member, the moveable member positioned between the upper resilient plate and the lower resilient plate, the upper resilient plate and the lower resilient configured for generating a restoring force to drive the moveable member to return to the initial position, the upper resilient plate defining four first positioning holes at four corners of the upper resilient plate;
   a housing comprising a top panel and four side panels extending from four peripheral sides of the top panel, the housing receiving the stationary member, the moveable member, the upper resilient plate and the lower resilient plate; and
   a spacer defining four locating holes at four corner of the spacer, the protrusions corresponding to the first positioning holes and the locating holes, wherein the protrusions extend through the first positioning holes and the locating holes the protrusions abut the top panel, the spacer abuts the to panel, and the spacer is positioned between the user resilient plate and the top panel.

2. The voice coil motor as claimed in claim 1, wherein the stationary frame further comprises a lower surface opposite to the upper surface, the moveable frame comprises a top surface and a bottom surface opposite to the top surface, the upper resilient plate comprises a first external frame, a first internal frame, and four resilient strips interconnecting the first external frame with the first internal frame, the first external frame is fixed to the upper surface, the first internal frame is fixed to the top surface, four slots are defined in the upper resilient plate between the first external frame and the first internal frame, the four slots are oriented about 90 degrees with respect to each other, each slot comprises a starting portion, a connecting portion, and an ending portion, and the ending portion is about three times longer than the starting portion.

3. The voice coil motor as claimed in claim 2, wherein the lower resilient plate comprises a second external frame, a second internal frame, a third external frame, a third internal frame, and four resilient arms, two resilient arms interconnect the second external frame with the second internal frame, the other resilient arms interconnect the third external frame with the third internal frame, the second and third external frames are fixed to the lower surface, and the second and third internal frames are fixed to the bottom surface.

4. The voice coil motor as claimed in claim 2, further comprising a base, wherein the base comprises a supporting surface and four posts perpendicularly extending from four corners of the supporting surface, the stationary member, the moveable member, the upper resilient plate, and the lower resilient plate are supported on the supporting surface, the lower resilient plate defines four second positioning holes at four corners of the lower resilient plate corresponding to the four posts, four engaging holes are defined at four corners of the lower surface and corresponding to the four posts, and the posts extend through the second positioning holes and the engaging holes, thereby fixing the lower resilient plate to the stationary frame.

5. The voice coil motor as claimed in claim 4, wherein the housing receives the spacer, the stationary member, the moveable member, the upper resilient plate, the lower resilient plate, and the base therein.

6. The voice coil motor as claimed in claim 5, wherein the housing is made of electromagnetic shielding material.

7. The voice coil motor as claimed in claim 2, wherein the magnetic unit consists of a first magnet and a second magnet, the stationary frame comprises a first sidewall, a second sidewall, a third sidewall parallel to the first sidewall, and a fourth sidewall parallel to the second sidewall, the four sidewalls are connected to each other end-to-end, the first magnet is fixed to the first sidewall, and the second magnet is fixed to the third sidewall.

8. The voice coil motor as claimed in claim 7, wherein the first sidewall defines a first receiving hole communicating with the first receiving room, the third sidewall defines a second receiving hole communicating with the first receiving room, the first magnet is adhered to the first receiving hole with adhesive, and the second magnet is adhered to the second receiving hole with adhesive.

9. The voice coil motor as claimed in claim 7, wherein the second sidewall and the fourth sidewall are sealed and filled with elastic material.

10. The voice coil motor as claimed in claim 2, wherein each of the resilient strips is substantially L-shaped and has a rounded corner.

* * * * *